US010636543B2

(12) United States Patent
Eshima et al.

(10) Patent No.: US 10,636,543 B2
(45) Date of Patent: Apr. 28, 2020

(54) COMPOSITE CABLE

(71) Applicant: Hitachi Metals, Ltd., Minato-ku, Tokyo (JP)

(72) Inventors: Hirotaka Eshima, Tokyo (JP); Yoshikazu Hayakawa, Tokyo (JP); Tomoyuki Murayama, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 16/459,881

(22) Filed: Jul. 2, 2019

(65) Prior Publication Data

US 2020/0013523 A1 Jan. 9, 2020

(30) Foreign Application Priority Data

Jul. 6, 2018 (JP) ................................. 2018-129100

(51) Int. Cl.
*B60R 16/02* (2006.01)
*H01B 7/00* (2006.01)
*H01B 7/17* (2006.01)
*H01B 11/02* (2006.01)
*H01B 13/06* (2006.01)

(52) U.S. Cl.
CPC ........... *H01B 7/17* (2013.01); *B60R 16/0215* (2013.01); *H01B 7/0045* (2013.01); *H01B 11/02* (2013.01); *H01B 13/06* (2013.01)

(58) Field of Classification Search
USPC ......................................................... 174/250
See application file for complete search history.

(56) References Cited

U.S. PATENT DOCUMENTS

| 2008/0212927 A1* | 9/2008 | Pavan ................. G02B 6/4494 385/103 |
| 2012/0063730 A1* | 3/2012 | Gagnon ............... G02B 6/4436 385/100 |
| 2012/0186851 A1* | 7/2012 | Winterhalter .......... H01B 5/105 174/113 C |

FOREIGN PATENT DOCUMENTS

| JP | 2006-351322 A | 12/2006 | |
| WO | WO-2016151754 A1 * | 9/2016 | ............. B60R 16/02 |

* cited by examiner

*Primary Examiner* — Timothy J Thompson
*Assistant Examiner* — Guillermo J Egoavil
(74) *Attorney, Agent, or Firm* — Crowell & Moring LLP

(57) ABSTRACT

Both deformation of a cross-sectional shape of the entire composite cable and deformation of a cross-sectional shape of an electric wire included in the composite cable are suppressed. The composite cable includes: a plurality of first electric wires; a shield electric wire in which a shield layer 33 is formed around a twist pair wire 32 obtained by intertwining a plurality of second electric wires; a sheath formed around an electric wire assembly obtained by intertwining the first electric wires and the shield electric wire; a first line filler filled between the twist pair wire and the shield layer; and a second line filler filled between the electric wire assembly and the sheath. The first electric wires and the shield electric wire are intertwined in a first direction, and the second electric wires are also intertwined in the first direction.

4 Claims, 4 Drawing Sheets

COMPOSITE CABLE

CROSS-REFERENCE TO RELATED APPLICATION

The present application claims priority from Japanese Patent Application No. 2018-129100 filed on Jul. 6, 2018, the content of which is hereby incorporated by reference into this application.

TECHNICAL FIELD OF THE INVENTION

The present invention relates to a composite cable including at least two types of electric wires.

BACKGROUND OF THE INVENTION

A composite cable having an assembly of a plurality of power supply wires and a plurality of signal wires (referred to as "electric wire assembly" in some cases below) and a sheath layer formed around this electric wire assembly has been known. That is, a composite cable in which an assembly of a plurality of electric wires is covered with a sheath layer has been known. The plurality of signal wires included in the electric wire assembly are intertwined with one another, and a shield layer is formed around the plurality of signal wires that are intertwined (Japanese Patent Application Laid-Open Publication No. 2006-351322: Patent Document 1).

SUMMARY OF THE INVENTION

Generally, in a composite cable described in the Patent Document 1 and other composite cables, a filler is formed between the electric wire assembly and the sheath layer in order to maintain a circular cross-sectional shape of such a composite cable.

However, in some cases, when the filler is formed between the electric wire assembly and the sheath layer, the shield layer formed around the signal wires is compressed by a pressure applied by the filler, and the cross-sectional shape of the shield layer cannot be circular. When the composite cable is bent with the originally-circular cross-sectional shape of the shield layer deforming into a shape other than the circular shape, there is a risk of breakage of the shield layer. Particularly, even a shield layer that has not been broken at the time of one bending of the composite cable has high possibility of breakage when the composite cable is repeatedly bent with the cross-sectional shape of the shield layer deforming.

As described above, a related-art composite cable has such a problem as causing the deformation of the cross-sectional shape of the shield layer formed around the signal wires due to the filler used for maintaining the cross-sectional shape of the entire composite cable to be circular.

The present invention has been made in consideration of the above-described problem, and an object of the present invention is to suppress the deformation of the cross-sectional shape of the shield layer formed around the signal wires while the cross-sectional shape of the composite cable is maintained.

A composite cable of the present invention includes: a plurality of first electric wires; a shield electric wire in which a shield layer is formed around a stranded electric wire obtained by intertwining a plurality of second electric wires; a sheath formed around an assembly obtained by intertwining the plurality of first electric wires and the shield electric wire; a first line filler filled between the stranded electric wire and the shield layer; and a second line filler filled between the assembly and the sheath. The plurality of first electric wires and the shield electric wire are intertwined in a first direction, and the plurality of second electric wires included in the shield electric wire are also intertwined in the first direction.

In one aspect of the present invention, the second line filler is intertwined together with the first electric wires and the shield electric wire in the first direction, and the first line filler is intertwined together with the second electric wires in the first direction.

In another aspect of the present invention, a filling rate of the first line filler is higher than a filling rate of the second line filler.

Instill another aspect of the present invention, the first line filler and the second line filler have the same cross-sectional area as each other, and the number of the first line filler per a unit cross-sectional area is larger than the number of the second line filler per a unit cross-sectional area.

Instill another aspect of the present invention, the first electric wire and the second line filler are directly in contact with each other.

According to the present invention, the deformation of the cross-sectional shape of the shield layer formed around the plurality of signal wires can be suppressed while the cross-sectional shape of the composite cable is maintained.

BRIEF DESCRIPTIONS OF THE DRAWINGS

DESCRIPTIONS OF THE PREFERRED EMBODIMENTS

Next, one embodiment example of the present invention will be described. A composite cable according to the present embodiment is a composite cable configuring a composite harness used in a vehicle such as a car. More specifically, the composite cable according to the present embodiment is a composite cable obtained by unifying an electric wire (EMB power supply wire) that supplies power to an electro-mechanical brake (EMB) with an electric wire (CAN signal wire) that transmits a signal for controlling the electro-mechanical brake by using a shared sheath. In other words, the composite cable according to the present embodiment is a multi-core cable including a plurality of power supply wires and signal wires. Hereinafter, a structure of the composite cable according to the present embodiment will be described in detail.

Figure 1:
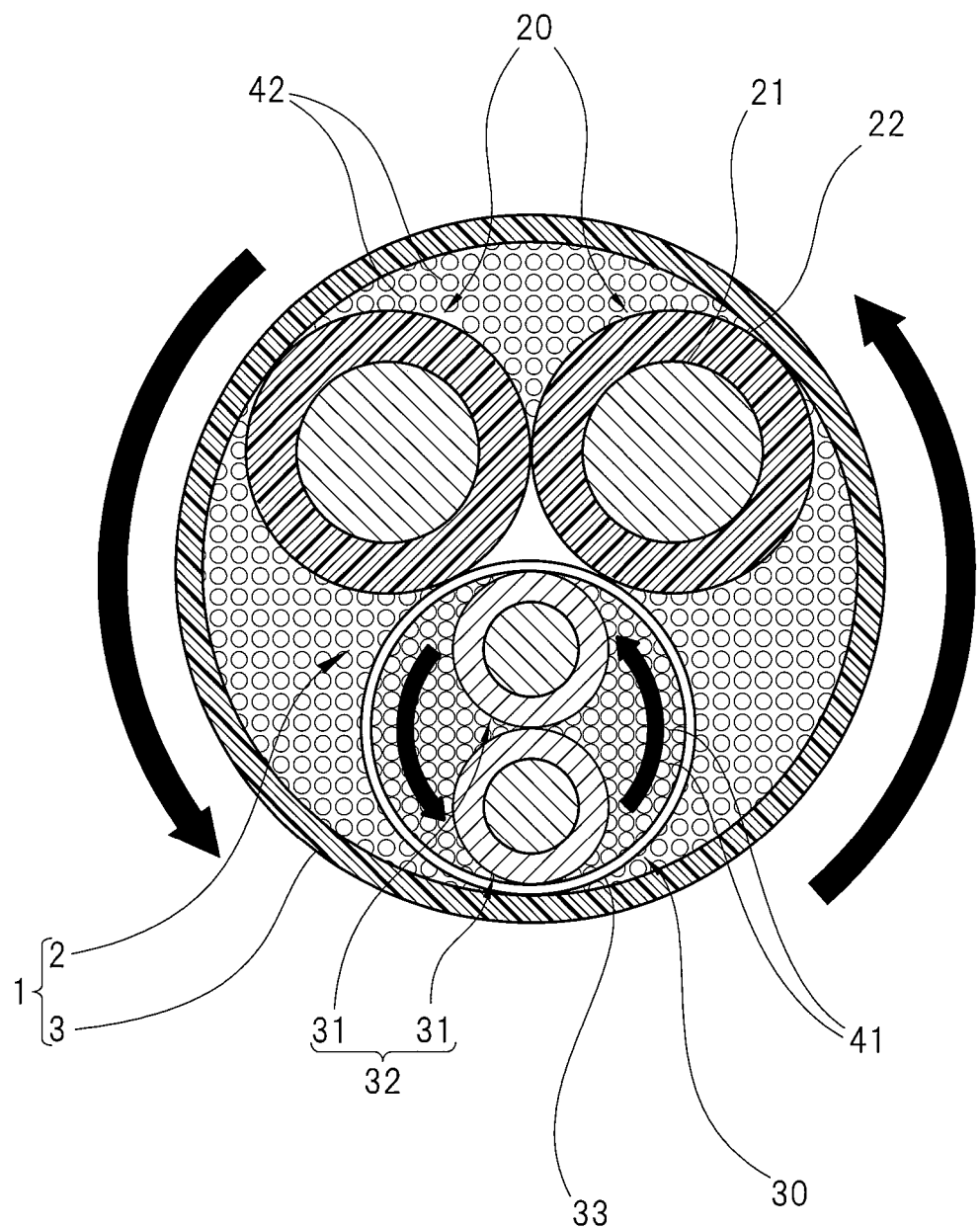
FIG. 1 is a cross-sectional view showing one example of a composite cable to which the present invention is applied.

As shown in FIG. 1, a composite cable 1 according to the present embodiment includes an assembly 2 made of a plurality of electric wires and a sheath 3 formed around the assembly 2, and has an outer diameter of 8 mm to 12 mm. The assembly 2 includes two first electric wires 20 and one shield electric wire 30. These three electric wires (two first electric wires 20 and one shield electric wire 30) are intertwined in a first direction. In the present embodiment, the two first electric wires 20 and the one shield electric wire 30 are intertwined in a counterclockwise direction (intertwined in a left-hand turning direction) in a cross section shown in FIG. 1. In other words, the two first electric wires 20 and the one shield electric wire 30 are intertwined in a Z twist manner. In the following description, the assembly 2 is referred to as "electric wire assembly 2" in some cases. The sheath 3 of the present embodiment is made of polyurethane.

The two first electric wires 20 included in the electric wire assembly 2 are power supply wires that supply power to the electro-mechanical brake. Each of the first electric wires 20 includes: a core wire 21 obtained by intertwining a plurality of copper wires or copper alloy wires; and an insulator 22 covering the core wire 21. A diameter of each of the plurality of copper wires or copper alloy wires configuring the core wire 21 is 0.08 mm to 0.12 mm, and the insulator 22 is made of a cross-linked polyethylene. In the present embodiment, the two first electric wires 20 are in contact with each other.

The shield electric wire 30 included in the electric wire assembly 2 includes: a stranded electric wire 32 obtained by intertwining a plurality of second electric wires 31 each having a smaller outer diameter than that of the first electric wire 20; and a shield layer 33 formed around this stranded electric wire 32. The stranded electric wire 32 according to the present embodiment is made of two second electric wires 31 that are intertwined in the first direction. That is, the two second electric wires 31 configuring the stranded electric wire 32 are intertwined in a counterclockwise direction (intertwined in a left-hand turning direction) in the cross section shown in FIG. 1. In other words, the two second electric wires 31 are intertwined in a Z twist manner.

As described above, in the present embodiment, an intertwining direction of the first electric wires 20 and the shield electric wire 30 (the electric wire assembly 2) and an intertwining direction of the plurality of second electric wires 31 configuring the stranded electric wire 32 included in the shield electric wire 30 are the same direction as each other.

The second electric wires 31 configuring the stranded electric wire 32 are the CAN signal wires that transmit signals for controlling the electro-mechanical brake. In the following description, the stranded electric wire 32 is referred to as "twist pair wire 32" in some cases. That is, the shield electric wire 30 according to the present embodiment includes: the twist pair wire 32; and a shield layer 33 formed around this twist pair wire 32. Note that each of the second electric wires 31 has the same basic structure as that of the first electric wire 20. That is, each of the second electric wires 31 includes a core wire obtained by intertwining a plurality of copper wires or copper alloy wires; and an insulator covering the core wire. A diameter of each of the plurality of copper wires or copper alloy wires configuring the core wire is 0.08 mm to 0.12 mm, and the insulator is made of cross-linked polyethylene. In the present embodiment, the two second electric wires 31 are in contact with each other inside the shield layer 33. The shield electric wire 30 in the present embodiment is in contact with each of the two first electric wires 20 while a part itself in a circumferential direction is positioned at a gap between the two first electric wires 20. Note that a wrapping part made of a non-woven fabric tape or a paper tape may be arranged on an outer circumference of the shield electric wire 30. In this manner, the first electric wires 20 and the shield layer 33 are in contact with each other, so that an effect of preventing damage of the insulator 22 can be obtained.

The shield electric wire 30 includes a first line filler 41 in addition to the twist pair wire 32 and the shield layer 33. More specifically, a portion between the twist pair wire 32 and the shield layer 33 is filled with a plurality of first line fillers 41. In the present embodiment, the twist pair wire 32 and some of the plurality of first line fillers 41 are in contact with an inner circumference of the shield layer 33. On the other hand, a portion between the electric wire assembly 2 and the sheath 3 is filled with a plurality of second line fillers 42. That is, the composite cable 1 includes: the plurality of first line fillers 41 filled between the twist pair wire 32 and the shield layer 33; and the plurality of second line fillers 42 filled between the electric wire assembly 2 and the sheath 3. Note that a wrapping part made of a non-woven fabric tape or a paper tape may be arranged between the twist pair wire 32/the first line fillers 41 and the shield layer 33. This manner causes such effects as causing the shield layer 33 to be easily formed on an outer circumference of the twist pair wire 32 and the first line fillers 41 and as preventing the damage of the insulators of the second electric wires 31 because of the contact between the second electric wires 31 and the shield layer 33.

Each of the first line fillers 41 included in the shield electric wire 30 is a cord or yarn made of polyethylene, PET (polyethylene terephthalate) or PP (polypropylene), and is intertwined together with the two second electric wires 31 in the first direction. Each of the second line fillers 42 is a string made of polyethylene, PET (polyethylene terephthalate) or PP (polypropylene), and is intertwined together with the first electric wires 20 and the shield electric wire 30 in the first direction. The first line filler 41 and the second line filler 42 are the same line filler as each other. However, a filling rate of the first line fillers 41 is higher than a filling rate of the second line fillers 42. In other words, the first line fillers 41 are more "dense" than the second line fillers 42, and the second line fillers 42 are more "sparse" than the first line fillers 41. In the present embodiment, note that the second line filler 42 is not arranged in a gap between the two first electric wires 20 and the shield electric wire 30.

The "same" between the first line filler 41 and the second line filler 42 described here means not only that the material (polyethylene) is the same but also that a cross-sectional area is the same. That is, the line fillers that are the same as each other in the cross-sectional area are filled between the twist pair wire 32 and the shield layer 33 and between the electric wire assembly 2 and the sheath 3, respectively. The filling rate of the line fillers (the first line fillers 41) between the twist pair wire 32 and the shield layer 33 is higher than the filling rate of the line fillers (the second line fillers 42) between the electric wire assembly 2 and the sheath 3. Since the first line filler 41 and the second line filler 42 have the same cross-sectional area as each other, difference in the filling rate therebetween corresponds to difference in the number of the line fillers per unit cross-sectional area between the first line fillers 41 and the second line fillers 42. That is, the difference in the filling rate therebetween indicates that the number of the first line fillers 41 per unit cross-sectional area is larger than the number of the second line fillers 42 per unit cross-sectional area. Note that the individual cross-sectional areas of the first line fillers 41 and the second line fillers 42 vary on manufacturing. The above explanation describing that the cross-sectional areas of the first line filler 41 and the second line filler 42 are the same as each other does not mean that such variation on the manufacturing is also eliminated.

As described above, the composite cable 1 according to the present embodiment includes the plurality of first line fillers 41 filled between the twist pair wire 32 and the shield layer 33 and the plurality of second line fillers 42 filled between the electric wire assembly 2 and the sheath 3. In this manner, the shield electric wire 30 is suppressed from being compressed by a pressure, and deformation of its cross-sectional shape is suppressed, the pressure being caused by the fillers (the second line fillers 42) filled between the electric wire assembly 2 and the sheath 3 including the shield electric wire 30 in order to maintain the cross-sectional shape of the entire composite cable 1. The filling rate of the first line fillers 41 is higher than the filling rate of the second line fillers 42. In other words, in the composite cable 1 according to the present embodiment, a filling density of the line fillers is different between inside and outside of the shield electric wire 30 so that the filling density of the line fillers inside the shield electric wire 30 is higher than the filling density of the line fillers around the shield electric wire 30. In this manner, the deformation of the cross-sectional shape of the shield electric wire 30 is further suppressed. That is, while the cross-sectional shape of the composite cable 1 is maintained, the deformation of the cross-sectional shape of the shield layer 33 formed around the signal wire 31 is suppressed. In this manner, even if the composite cable 1 is repeatedly bent, the possibility of the breakage of the shield layer 33 is low.

Further, in the composite cable 1 according to the present embodiment, the intertwining direction of the first electric wires 20, the shield electric wire 30 and the second line fillers 42 is the same as the intertwining direction of the second electric wires 31 and the first line fillers 41 configuring the stranded electric wire 32. In other words, the intertwining direction of the wire materials outside the shield layer 33 is identical to the intertwining direction of the wire materials inside the shield layer 33. Therefore, when bending or twisting is applied to the composite cable 1, the intertwining of the first electric wires 20, the shield electric wire 30 and the second line fillers 42 outside the shield layer 33 and the intertwining of the second electric wires 31 and the first line fillers 41 inside the shield layer 33 open in the same direction as each other (the intertwining is loosened), or close (the intertwining is tightened). At this time, the shield layer 33 opens or closes in synchronization with the intertwining (a diameter of the shield layer 33 increases or decreases). As a result, when the intertwining of the shield member 33 attempts to open, load from the first electric wires 20 and the second line fillers 42 is reduced without the closing of the intertwining of the first electric wires 20 and the second line fillers 42. In this manner, when the bending or the twisting is applied to the composite cable 1, a load which the shield layer 33 receives is reduced, and endurance of the shield layer 33 is improved, and thus, endurance of the composite cable 1 such as bending endurance is improved.

The present invention is not limited to the foregoing embodiment, and various alterations can be made within the scope not changing the concept. For example, the shield layer 33 according to the present embodiment is a braided shield obtained by braiding a plurality of metal wires each made of copper or others. However, the shield layer 33 is not limited to the braided shield. The shield layer 33 may be, for example, a served (laterally-wound) shield that is helically wound on an outer circumference of the twist pair wire 32. In the above-described embodiment, the shield layer corresponding to the shield layer 33 is not formed around the first electric wires 20. As a result, the first electric wires 20 and the second line fillers 42 are directly in contact with each other. However, an embodiment of arrangement of the shield layer corresponding to the shield layer 33 around the first electric wires 20 is also applicable.

Figure 2:
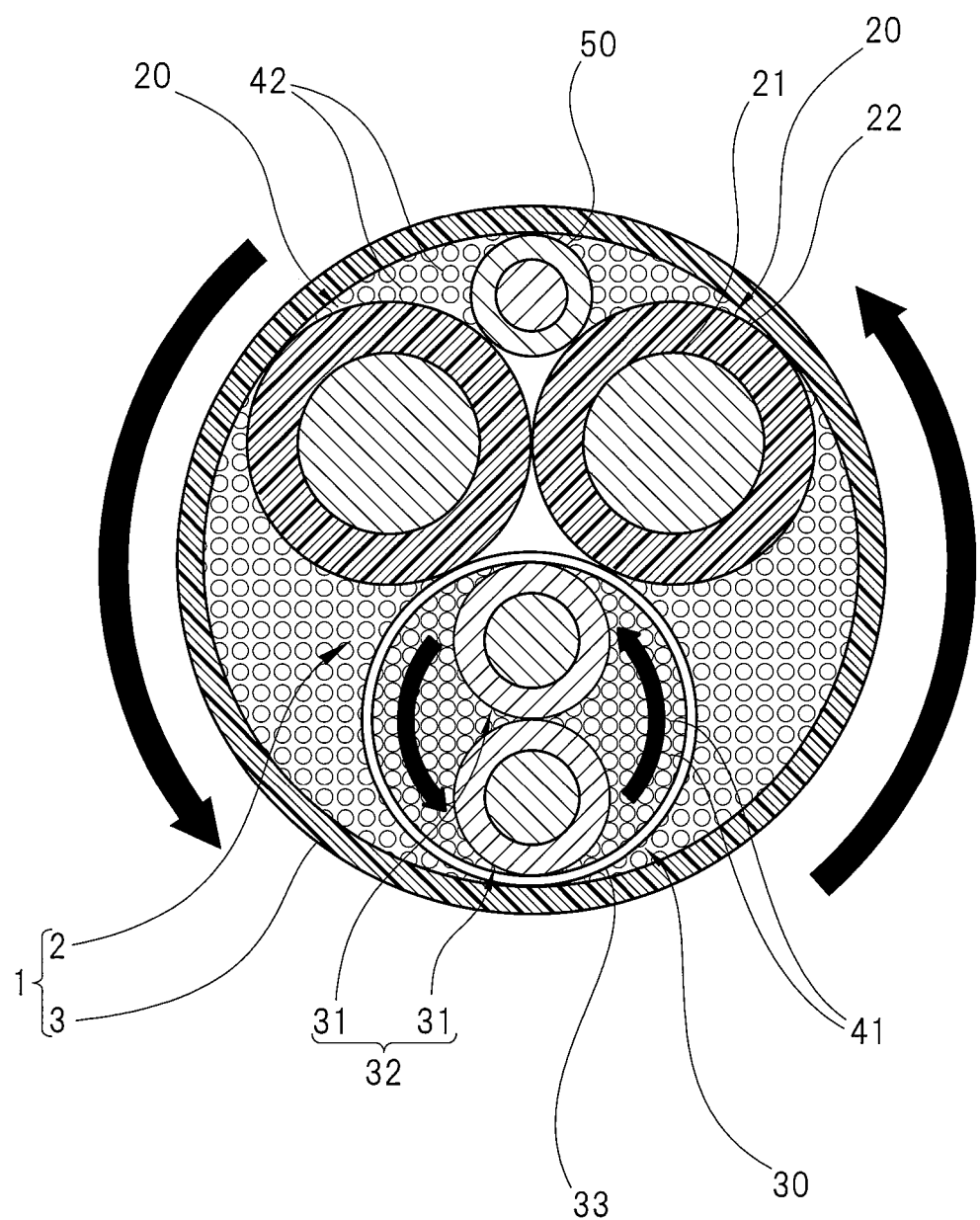
FIG. 2 is a cross-sectional view showing another example of the composite cable to which the present invention is applied.

As shown in FIG. 2, an embodiment of arrangement of an earth wire 50 is also applicable. The illustrated earth wire 50 is intertwined in the first direction (intertwined counter-clockwise) together with the first electric wires 20, the shield electric wire 30 and the second line fillers 42.

Figure 3:
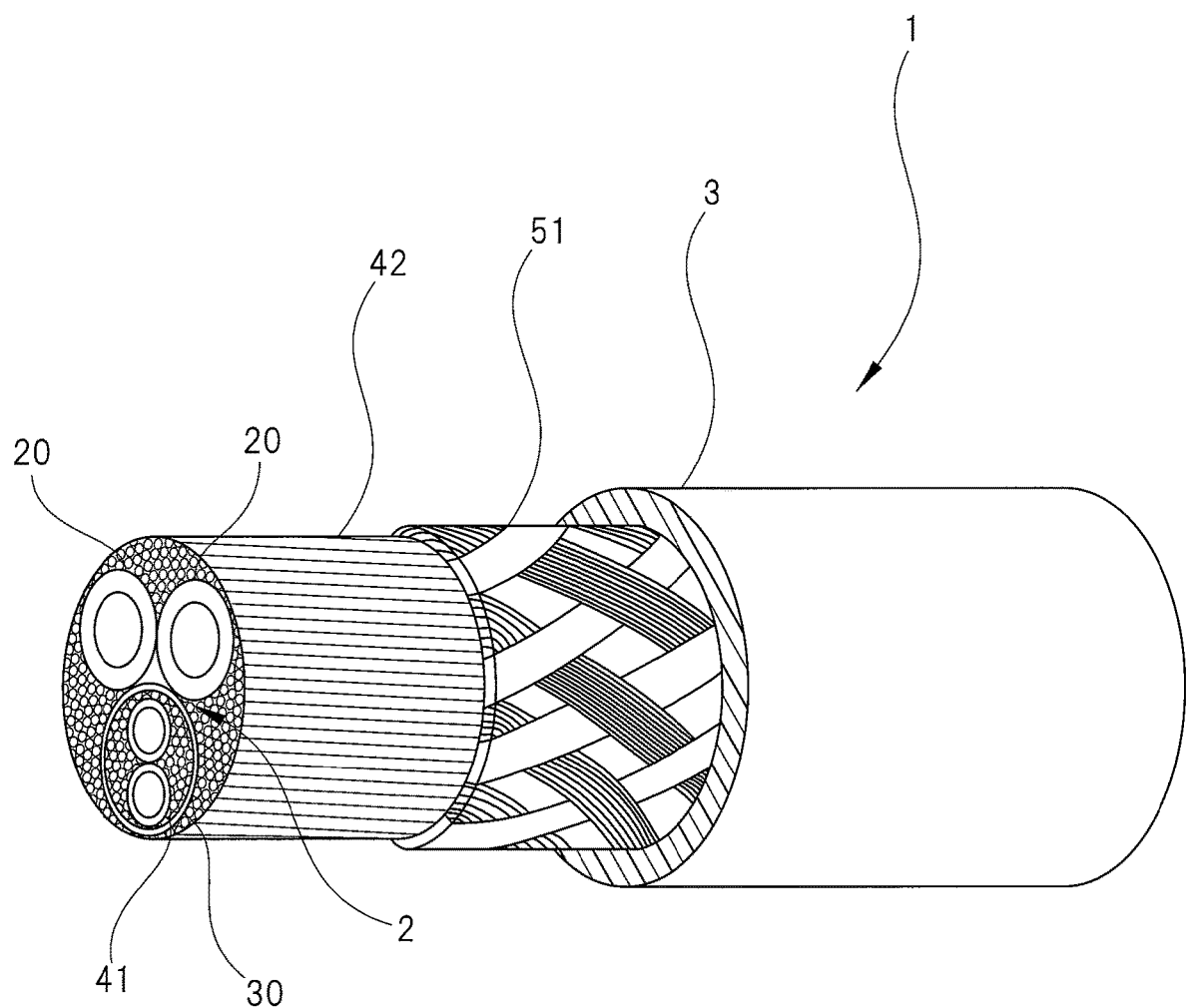
FIG. 3 is a cross-sectional view showing still another example of the composite cable to which the present invention is applied.

As shown in FIG. 3, an embodiment of arrangement of a braided shield 51 inside the sheath 3 is also applicable. Note that FIG. schematically shows the cross-sectional structure of the composite cable 1.

Figure 4:
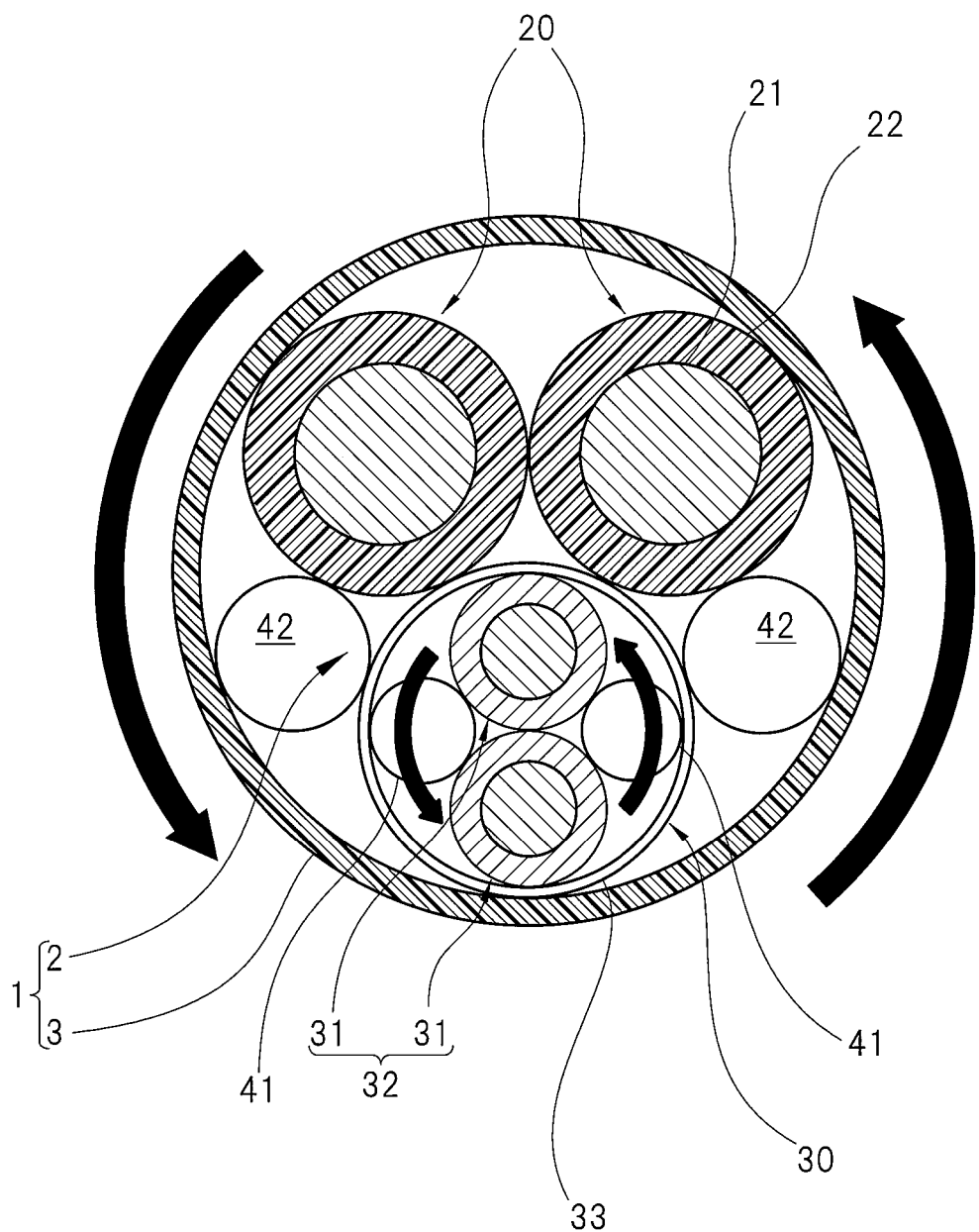
FIG. 4 is a cross-sectional view showing still another example of the composite cable to which the present invention is applied.

As shown in FIG. 4, an embodiment of usage of first line fillers 41 and second line fillers 42 each having a larger diameter than those of the line fillers shown in FIGS. 1 and 2 is also applicable. In the embodiment shown in the drawing, two second line fillers 42 are formed outside the shield layer 33, and two first line fillers 41 are formed inside the shield layer 33.

The cross-sectional areas of the first line filler 41 and the second line filler 42 shown in FIG. 4 are different from each other. However, a ratio of the cross-sectional areas of the first line fillers 41 to the cross-sectional area of the shield electric wire 30 is larger than a ratio of the cross-sectional areas of the second line fillers 42 to the cross-sectional area of the composite cable 1. In other words, when it is assumed that a cross-sectional area of a region inside the shield layer 33 in the entire cross-sectional area of the composite cable 1 is an "inner cross-sectional area" while a cross-sectional area of a region outside the shield layer 33 therein is an "outer cross-sectional area", a ratio of the cross-sectional areas of the first line fillers 41 to the inner cross-sectional area is larger than a ratio of the cross-sectional areas of the second line fillers 42 to the outer cross-sectional area. That is, the filling rate of the first line fillers 41 is higher than the filling rate of the second line fillers 42. Therefore, also in the embodiment shown in FIG. 4, the shield electric wire 30 is suppressed from being compressed by a pressure caused by the second line fillers 42, and its cross-sectional shape does not deform.

An embodiment of the usage of the first line fillers 41 and the second line fillers 42 each being such as a cord, a yarn or a thread made of a material other than polyethylene is also applicable. For example, an embodiment of the usage of the first line fillers 41 and the second line fillers 42 each being a spun rayon yarn is also applicable.

An embodiment of the usage of the sheath 3 made of a material (such as ethylene propylene diene rubber (EPDM)) other than polyurethane is also applicable. An embodiment of the usage of the insulator 22 made of a material (such as fluorocarbon resin) other than the cross-linked polyethylene is also applicable.

An embodiment of the winding of the wrapping tape such as the non-woven fabric tape or the paper tape around the first line fillers 41 and the second line fillers 42 is also applicable. In this case, the wrapping tape may be laterally wound or longitudinally wound.

The intertwining direction of the first electric wires 20 and the shield electric wire 30 and the intertwining direction of the second electric wires 31 configuring the stranded electric wire 32 are not limited to the directions shown in FIG. 1 and others as long as these directions are the same as each other. That is, an embodiment of the intertwining of the first electric wires 20 and the shield electric wire 30 in a clockwise direction in the cross section shown in FIG. 1 and others and the intertwining of the plurality of second electric wires 31 configuring the stranded electric wire 32 also in the clockwise direction in the cross section shown in FIG. 1 and others is also applicable.

The numerical values and the ranges of the numerical values described in the present specification are only one example. The numbers of and the types of the electric wires included in the composite cable of the present invention can be appropriately added, eliminated and changed in accordance with the application of the composite cable. The present invention is also applicable to a composite cable other than the composite cable used for the vehicle wire harness. On the other hand, the composite cable to which the present invention is applied has such an advantage effect as causing the inner electric wires to be difficult to be compressed at the time of the bending. In this viewpoint, the present invention is suitable to be applied to a composite cable used when the bending is repeated. For example, the present invention is particularly suitable to be applied to a composite cable or others that is routed along an arm of an industrial robot and that is repeatedly bent in accordance with movement of the arm.

What is claimed is:

1. A composite cable comprising:
    a plurality of first electric wires;
    a shield electric wire in which a shield layer is formed around a stranded electric wire obtained by intertwining a plurality of second electric wires;
    a sheath formed around an assembly obtained by intertwining the plurality of first electric wires and the shield electric wire;
    a first line filler filled between the stranded electric wire and the shield layer; and
    a second line filler filled between the assembly and the sheath,
    wherein the plurality of first electric wires and the shield electric wire are intertwined in a first direction, and the plurality of second electric wires included in the shield electric wire are also intertwined in the first direction, and
    a filling rate of the first line filler is higher than a filling rate of the second line filler.

2. The composite cable according to claim 1,
    wherein the second line filler is intertwined in the first direction together with the first electric wires and the shield electric wire, and
    the first line filler is intertwined in the first direction together with the second electric wires.

3. The composite cable according to claim 1,
    wherein the first line filler and the second line filler have the same cross-sectional area as each other, and
    the number of the first line filler per unit cross-sectional area is larger than the number of the second line filler per unit cross-sectional area.

4. The composite cable according to claim 1,
    wherein the first electric wire and the second line filler are directly in contact with each other.

* * * * *